(12) United States Patent
Garbes

(10) Patent No.: US 7,524,156 B2
(45) Date of Patent: Apr. 28, 2009

(54) PORTABLE AND STOWABLE RAMP AND EQUIPMENT STORAGE SYSTEM FOR PICKUP TRUCKS

(76) Inventor: Larry Vern Garbes, 32864 190th St., Clarksville, IA (US) 50629

( * ) Notice: Subject to any disclaimer, the term of this patent is extended or adjusted under 35 U.S.C. 154(b) by 114 days.

(21) Appl. No.: 11/160,967

(22) Filed: Jul. 18, 2005

(65) Prior Publication Data

US 2006/0177294 A1    Aug. 10, 2006

Related U.S. Application Data

(60) Provisional application No. 60/649,831, filed on Feb. 4, 2005.

(51) Int. Cl.
*B65G 67/02* (2006.01)
(52) U.S. Cl. .................. 414/537; 296/37.6
(58) Field of Classification Search ............ None
See application file for complete search history.

(56) References Cited

U.S. PATENT DOCUMENTS

| | | | |
|---|---|---|---|
| 3,032,217 A * | 5/1962 | Musson et al. ............ 254/3 R |
| 3,613,920 A * | 10/1971 | Flamm ..................... 414/537 |
| 3,720,335 A * | 3/1973 | Ward ........................ 414/469 |
| 3,870,170 A | 3/1975 | Noble et al. |
| 3,977,545 A | 8/1976 | Lloyd |
| 4,601,632 A | 7/1986 | Agee |
| 4,624,619 A | 11/1986 | Uher |
| 4,685,857 A | 8/1987 | Goeser et al. |
| 4,733,898 A | 3/1988 | Williams |
| 4,830,242 A * | 5/1989 | Painter ................... 224/42.32 |
| 4,900,217 A | 2/1990 | Nelson |
| 4,990,049 A | 2/1991 | Hargrove |
| 5,090,335 A * | 2/1992 | Russell ...................... 108/44 |
| 5,257,894 A * | 11/1993 | Grant ........................ 414/537 |
| 5,570,989 A * | 11/1996 | Belanger ................... 414/537 |
| 5,795,125 A | 8/1998 | Walkden |
| 6,328,366 B1 * | 12/2001 | Foster et al. ............. 296/37.6 |
| 6,612,635 B1 * | 9/2003 | Scherrer .................... 296/61 |
| 6,629,714 B2 * | 10/2003 | Campbell ................. 296/37.6 |
| 6,705,820 B2 * | 3/2004 | Schilling .................. 414/462 |
| 6,811,067 B2 * | 11/2004 | Muizelaar et al. ......... 224/404 |
| 6,880,194 B2 | 4/2005 | O'Donnell et al. |
| 7,159,917 B2 * | 1/2007 | Haaberg ................. 296/26.09 |
| 2004/0155476 A1 | 8/2004 | Emery et al. |
| 2006/0284437 A1 * | 12/2006 | Collins et al. ............ 296/37.6 |

* cited by examiner

*Primary Examiner*—James Keenan
(74) *Attorney, Agent, or Firm*—Simmons Perrine Moyer Bergman PLC

(57) ABSTRACT

A portable ramp and tool container for use in the bed of a pickup truck where the container includes interchangeable retractable and extendable ramps and tool trays which pull out from the container. Portions of the ramps can pivot downward to contact the ground while the tool tray may have a leg attached for support.

4 Claims, 4 Drawing Sheets

PORTABLE AND STOWABLE RAMP AND EQUIPMENT STORAGE SYSTEM FOR PICKUP TRUCKS

BACKGROUND OF THE INVENTION

It is desirable in the setting of vehicle transportation equipment to provide the ability for a pickup truck to carry all-terrain vehicles, lawn and garden tractors or other heavy power equipment in the back of a pickup truck. It has been well known to use ramps to attach to the tailgate to facilitate loading and unloading of objects into the bed of the pickup truck.

One example of prior art ramp systems is shown in U.S. Pat. No. 3,870,170 issued to Noble et al.

One problem with such ramp systems is their limited versatility.

Consequently, there exists a need for improved methods and apparatuses for loading heavy object into a pickup truck.

SUMMARY OF THE INVENTION

It is an object of the present invention to provide a pickup truck ramp and equipment storage system with improved flexibility of functionality.

It is a feature of the present invention to include interchangeable equipment storage boxes and ramp inserts.

It is an advantage of the present invention to permit rapid reconfiguration of ramp and equipment storage box configurations.

It is another object of the present invention to provide a durable and light-weight ramp and storage system.

It is another feature of the present invention to include a box end that forms a sturdy miniature ramp.

It is another feature of the present invention to include low friction skid plates inside the box to facilitate sliding of the ramps.

It is another advantage of the present invention to reduce the weight associated with a ramp system.

It is another object to provide flexibility in ramp lengths.

It is another feature to include nested ramps which can be pulled from a stowed position to a deployed position.

It is another advantage to provide for rapid reconfiguration of ramp length.

The present invention is an improved method and apparatus for transporting objects in a pickup box, which is designed to satisfy the aforementioned needs, provide the previously stated objects, include the above-listed features, and achieve the already articulated advantages.

Accordingly, the present invention is a method and apparatus for storing and deploying extendable ramps and equipment storage boxes in a container in the box of a pickup truck which uses multiple interchangeable ramp and storage slots.

BRIEF DESCRIPTION OF THE DRAWINGS

The invention may be more fully understood by reading the following description of preferred embodiments of the invention, in conjunction with the appended drawings wherein.

DETAILED DESCRIPTION

Figure 1:
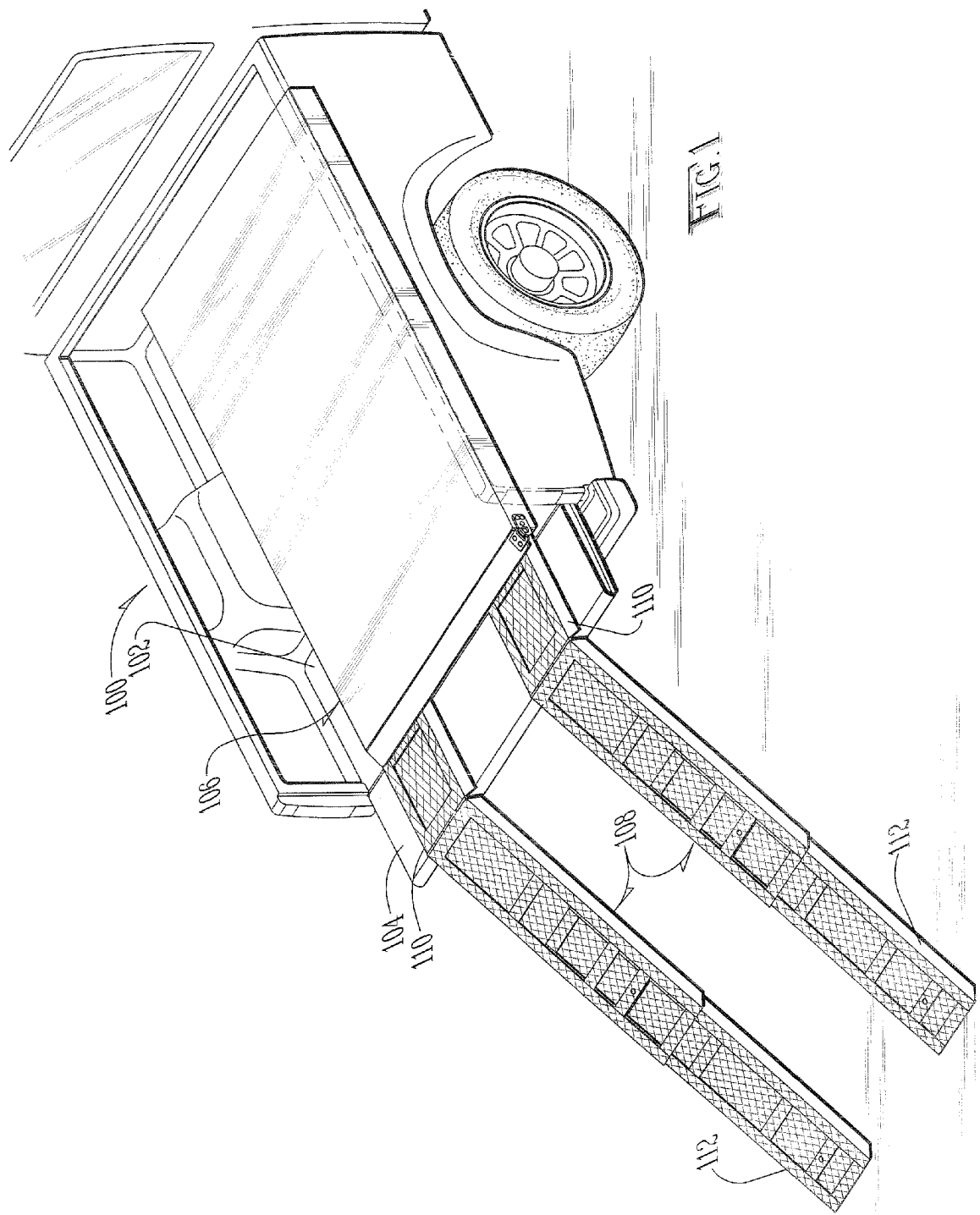
FIG. 1 is a perspective view of a truck of the present invention having a ramp system installed therein.

Now referring to the drawings, wherein like numerals refer to like matter throughout, and more particularly to FIG. 1, there is shown a rear end of pickup truck 100, or this could be a truck with a box, a flatbed, dump box, or other cargo area. Pickup truck 100 is shown having a pickup truck bed 102 and a tailgate 104. Ramp and equipment storage system box 106 is disposed in the pickup truck bed 102 and is shown having distal ramps 112 disposed inside of intermediate ramps 108 which are disposed next to proximal ramps 110 which may be detachably coupled to the ramp and equipment storage system box 106 via a flange or other structural member which if pulled out straight would engage an end of the ramp and equipment storage system box 106, but if tipped or tilted, can be made to be removed.

All of the ramps, including proximal ramps 110 which lay upon the tailgate 104 and are hinged along a bottom edge to a bottom edge of intermediate ramps 108 which have nested therein distal ramps 112, are configured to be stored inside of ramp and equipment storage system box 106, coupled to ramp and equipment storage system box 106 and deployed for use in loading and unloading objects from the pickup truck 100 or detached and removed from ramp and equipment storage system box 106. Ramp and equipment storage system box 106 may be made of steel, aluminum, plastic or other suitable material. The ramp and equipment storage system box 106 may be made to be 3 or 4 inches high, more or less. A 4-inch or higher depth of ramp and equipment storage system box 106 readily permits the ramps to be slightly thicker and, therefore, stronger and also permits the equipment storage box 202 (FIG. 2.) to be deep enough to handle fishing reels attached to fishing poles and certain other hand tools, such as shovels etc. The intermediate ramps 108, proximal ramps 110, and distal ramps 112 may be steel, aluminum, plastic, or other suitable materials. The material choice may depend upon the types of objects that will be used on the ramps and the environments and other circumstances typically involved in their use. FIG. 1 shows two ramps separated by a central region with no ramps or other structure extending from the ramp and equipment storage system box 106.

Distal ramps 112 are shown retracted or nested within intermediate ramps 108. If the desire were to have longer ramps, then distal ramps 112 could be merely pulled or extracted from the interior cavity in intermediate ramps 108.

Figure 2:
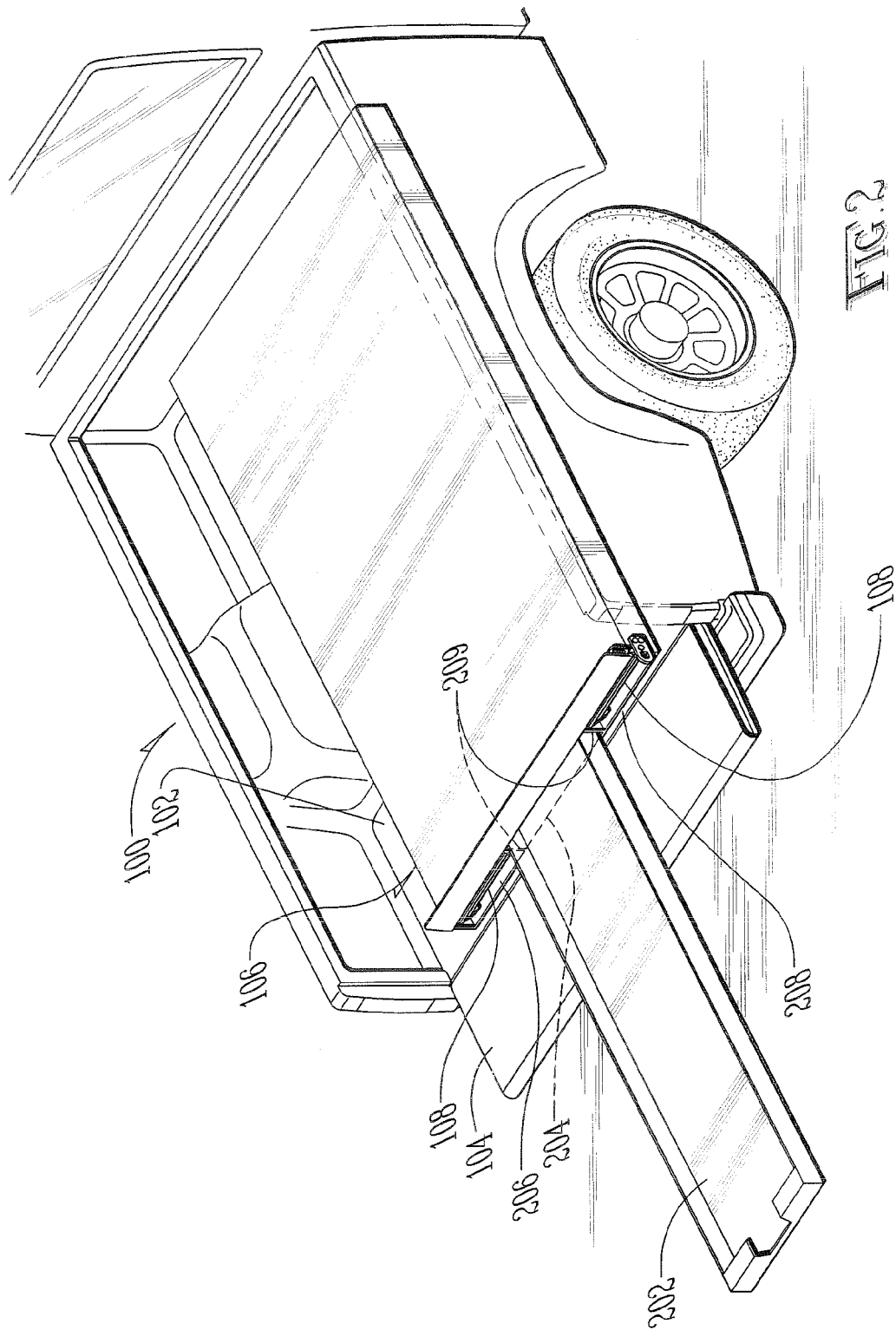
FIG. 2 is a perspective view of the ramp system of FIG. 1, where the equipment storage box is extended and the ramps retracted.

Now referring to FIG. 2, there is shown the ramp and equipment storage system box 106 of the present invention. Equipment storage tray 202 is shown in a more close-up view after having been extracted from central bay 204 of ramp and equipment storage system box 106. The intermediate ramps 108 are shown in a retracted configuration in driver's side bay 206 and passenger's side bay 208. It should be understood that equipment storage tray 202 is completely removable from central bay 204, and it can be replaced by another ramp assembly. This would provide for a nearly continuous ramp and would be ideal for 3-wheelers, snowmobiles and other objects. In another embodiment, the central bay 204 might be the only ramp (e.g. for a motorcycle) and the driver's side bay 206 and passenger's side bay 208 could be filled with equipment storage trays 202 or left empty if weight is a serious concern. In still another configuration, central bay 204 and passenger's side bay 208 might be filled with ramps, while driver's side bay 206 is used for equipment storage tray 202. This could permit storage and at the same time, provide a unified ramp which might be used for snowmobiles, etc. Central bay 204 may be defined by a longitudinal support 209 on each side which could be an I-beam, solid member or other structural support. Additional support members may be added, depending upon the weight of the objects which are to be moved up the ramps and stored atop the ramp and equipment storage system box 106.

Figure 3:
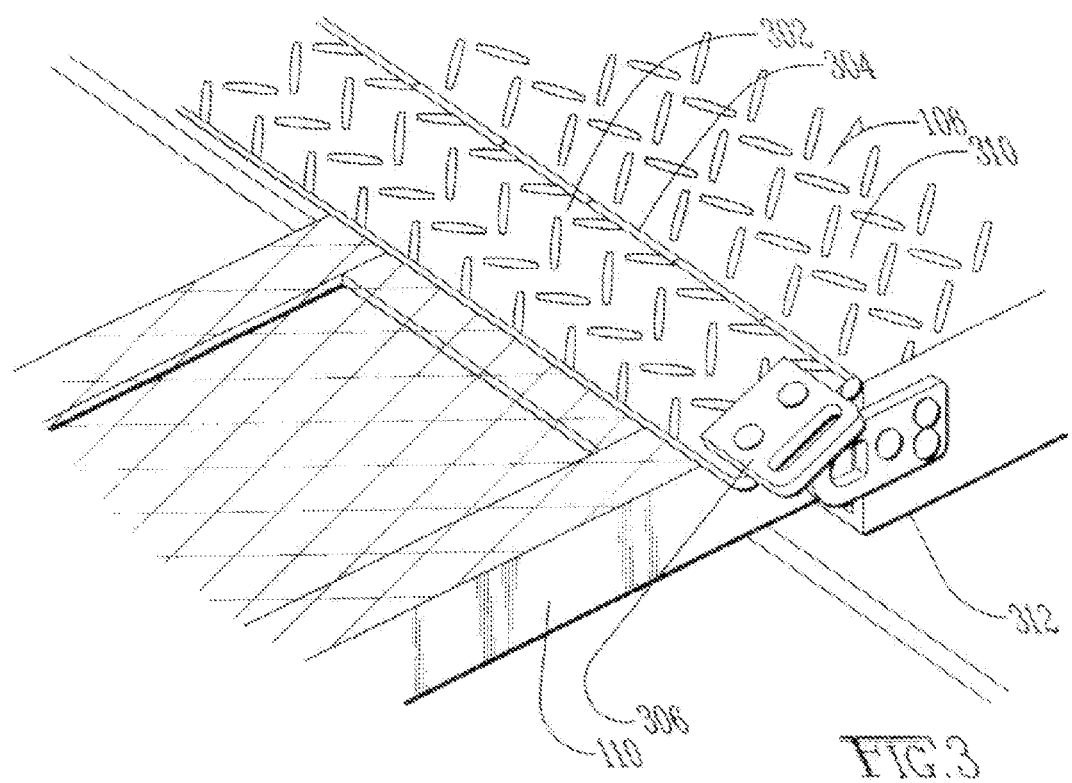
FIG. 3 is a perspective close-up view of the box end/mini-ramp in combination with an underlying retractable ramp.

Now referring to FIG. 3, there is shown a close-up perspective view of the ramp and equipment storage system box 106 with proximal ramps 110 extending out from under the box end/mini-ramp 302. Box end/mini-ramp 302 is coupled to box top 310 via end-to-box top hinge 304. Box end/mini-ramp 302 forms the end of ramp and equipment storage system box 106 when the ramps and trays are stowed and forms a mini-ramp extending from the proximal ramps 110 when they are positioned over the tailgate 104. Ramp and equipment storage system box 106 is shown having a box bottom side 312. End to box latch member 306 may be provided to aid in latching box end/mini-ramp 302 shut when the ramps and trays are stowed.

Figure 4:
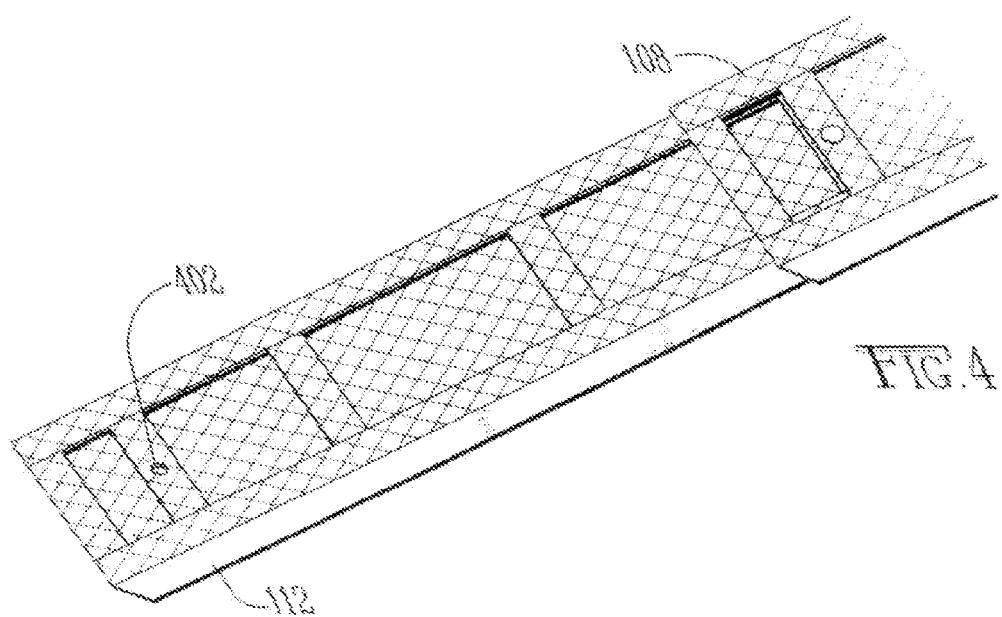
FIG. 4 is perspective view of the distal ramp being pulled from the intermediate ramp.

Now referring to FIG. 4, there is shown the distal ramps 112 being pulled from the intermediate ramps 108. Also shown is distal ramp-retaining pin-receiving hole 402 which have the pin removed to allow distal ramps 112 to slide from within intermediate ramps 108. Depending upon the type of equipment to be loaded on the ramp and equipment storage system box 106, the ramps may need to be extended by deploying the distal ramps 112.

Figure 5:
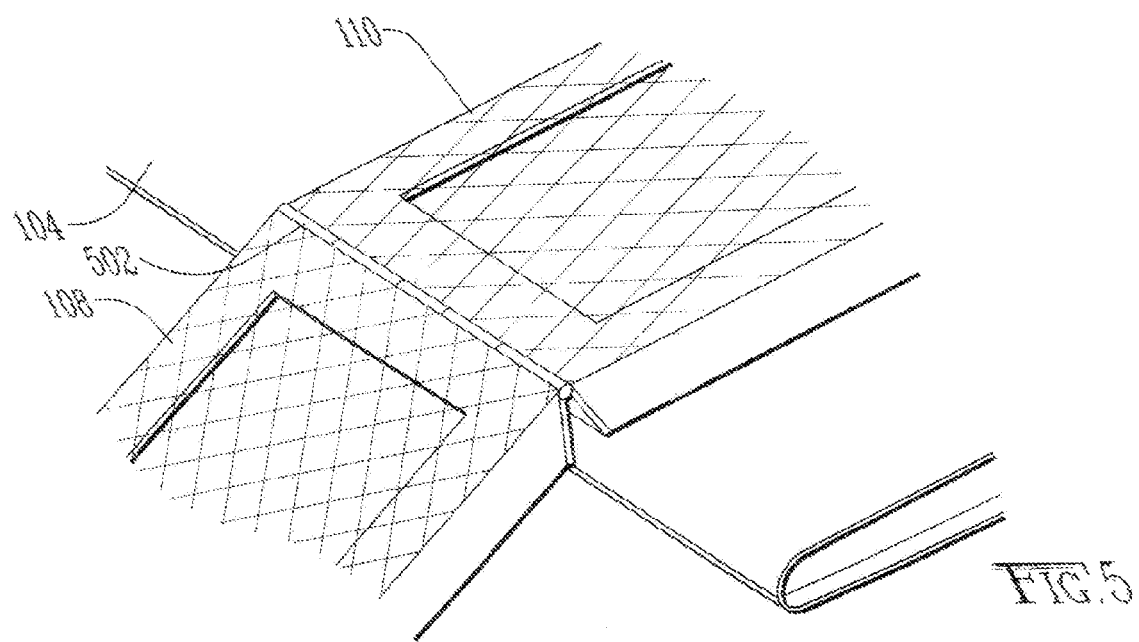
FIG. 5 is a close-up depiction of a hinge between the proximal ramp and the intermediate ramp.

Now referring to FIG. 5, there is shown the proximal ramp to intermediate ramp hinge 502 which connects the bottom rear edge of proximal ramps 110 to the front bottom edge of intermediate ramps 108. It may be desired in operation to have the proximal ramp to intermediate ramp hinge 502 be disposed further toward the ramp and equipment storage system box 106 so as to be supported from underneath by the tailgate 104.

The present invention is shown as being a self-contained ramp and equipment storage system box 106 which is bolted to the bed of the pickup truck 100. It should be understood that the system of the present invention could be manufactured with the truck and incorporated into the bed of the truck.

It is thought that the method and apparatus of the present invention will be understood from the foregoing description, and it will be apparent that various changes may be made in the form, construction, steps and arrangement of the parts and steps thereof without departing from the spirit and scope of the invention or sacrificing all of the material advantages, the form herein described being merely a preferred or exemplary embodiment thereof.

What is claimed is:

1. An apparatus for loading a wheeled vehicle in a bed of a pickup truck, the apparatus comprising:
   an equipment storage system cover having a cab end and a tailgate end; the equipment storage system cover being disposed on the bed;
   a pair of retractable ramps configured to be selectively stored in and removed from the equipment storage system cover;
   the pair of retractable ramps being configured for extending generally horizontally from the tailgate end over a tailgate;
   each of the pair of retractable ramps being further configured to pivot about an intermediate hinge, generally disposed at an outside end of the tailgate, so as to angle downward to a ground position;
   one of an interchangeable and retractable tool tray and an interchangeable central ramp disposed in a central bay between the pair of retractable ramps;
   wherein the central bay is defined by a longitudinal support on each side;
   a cover end ramp member configured to be an end to the ramp and equipment storage system cover and to form a ramp when a top edge is hinged to the ramp and equipment storage system cover and a bottom edge is free and spans and contacts a top portion of each of the pair of retractable ramps and one of the interchangeable retractable tool tray and the interchangeable central ramp disposed therebetween and further rests upon a generally horizontal portion of each of the pair of retractable ramps;
   wherein each of the pair of retractable ramps further comprises an extendable distal ramp portion disposed within a portion of the ramp and configured to be slid out so as to extend an overall length of the ramp.

2. The apparatus for loading a wheeled vehicle in a bed of a pickup truck of claim 1 wherein the one of an interchangeable and retractable tool tray and an interchangeable central ramp disposed between the pair of retractable ramps comprises the interchangeable and retractable tool tray.

3. The apparatus for loading a wheeled vehicle in a bed of a pickup truck of claim 1 wherein the one of an interchangeable and retractable tool tray and an interchangeable central ramp disposed between the pair of retractable ramps comprises the interchangeable central ramp.

4. A method of converting an interchangeable retractable ramp and storage tray system from a first configuration suitable for a four wheeler and a single tool tray to a second configuration suitable for a three wheeler and then to a third configuration for a motorcycle with two tool trays; comprising the steps of:
   providing a box, in the bed of a truck, the box comprising at least three co-planar bays defined by a pair of longitudinal supports on either side of a central bay, where each bay is configured for interchangeably receiving therein a retractable ramp having an intermediate hinge and telescoping ramp sections and a retractable tool tray;
   providing a retractable tool tray in the central bay and a passenger side retractable ramp having an intermediate hinge and telescoping ramp sections therein in a passenger side bay, which is one of said at least three co-planar bays, and a driver side ramp having an intermediate hinge and telescoping ramp sections therein in a driver side bay, which is one of said at least three co-planar bays;
   removing the retractable tool tray from the central bay and inserting in the central bay a central retractable ramp having an intermediate hinge and telescoping ramp sections therein;
   removing the passenger side retractable ramp and inserting into the passenger side bay a retractable tool tray; and
   removing the driver side retractable ramp and inserting in the driver side bay a retractable tool tray.

* * * * *